US011101720B2

United States Patent
Hein et al.

(10) Patent No.: US 11,101,720 B2
(45) Date of Patent: Aug. 24, 2021

(54) METHOD FOR CONNECTING FLAT WIRE ENDS AND STATOR PRODUCED IN SUCH A WAY

(71) Applicant: Robert Bosch GmbH, Stuttgart (DE)

(72) Inventors: Tobias Hein, Gronau (DE); Fabian Lange, Hannover (DE); Martin Ermer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 16/344,145

(22) PCT Filed: Aug. 28, 2017

(86) PCT No.: PCT/EP2017/071528
§ 371 (c)(1),
(2) Date: Apr. 23, 2019

(87) PCT Pub. No.: WO2018/077511
PCT Pub. Date: May 3, 2018

(65) Prior Publication Data
US 2019/0326801 A1 Oct. 24, 2019

(30) Foreign Application Priority Data
Oct. 24, 2016 (DE) ...................... 10 2016 220 863.2

(51) Int. Cl.
*H02K 15/00* (2006.01)
*B23K 26/22* (2006.01)
(Continued)

(52) U.S. Cl.
CPC ......... *H02K 15/0081* (2013.01); *B23K 26/22* (2013.01); *H02G 1/12* (2013.01); *H02K 3/14* (2013.01); *B23K 2101/36* (2018.08)

(58) Field of Classification Search
CPC ...................... H02K 3/34; H02K 3/38; H02K 15/0081–0087; H02K 15/0421–0428; H02K 15/105; H02K 15/068; H02G 1/12
(Continued)

(56) References Cited

U.S. PATENT DOCUMENTS 6,990,724 B2 * 1/2006 Tamura .............. H02K 15/0056
29/596
2006/0267440 A1 * 11/2006 Sakai ................... H02K 15/064
310/184
(Continued)

FOREIGN PATENT DOCUMENTS

CN 102362416 A 2/2012
DE 102013006361 4/2014
(Continued)

OTHER PUBLICATIONS

Machine translation of JP 2016158345 A, retrived from Espacenet.*
(Continued)

*Primary Examiner* — Quyen P Leung
*Assistant Examiner* — Minki Chang
(74) *Attorney, Agent, or Firm* — Michael Best & Friedrich LLP

(57) ABSTRACT

The invention relates to a method for connecting free flat wire ends (4, 5) with a substantially rectangular cross section with four sides (41, 42, 43, 44) of a stator of an electrical machine, comprising the steps at: stripping a first flat wire end (4), sheathed with an insulation material, such that partial stripping is carried out at least on three sides (41, 42, 43) and such that the insulation material remains complete on a fourth side (44) of the first flat wire end (4), and electrically connecting the stripped first flat wire end (4) on the completely stripped side (43) to a second flat wire end (5).

19 Claims, 4 Drawing Sheets

(51) Int. Cl.
 *H02G 1/12* (2006.01)
 *H02K 3/14* (2006.01)
 *B23K 101/36* (2006.01)
(58) Field of Classification Search
 USPC .................................................. 310/179–215
 See application file for complete search history.

(56) References Cited

U.S. PATENT DOCUMENTS

2008/0191574 A1    8/2008  Tokizawa
2012/0032550 A1*   2/2012  Wolf ..................... B23K 20/16
                                                  310/198

FOREIGN PATENT DOCUMENTS

| EP | 1727260 | | 11/2006 |
| JP | 5048438 B2 | | 10/2012 |
| JP | 2014007795 | | 1/2014 |
| JP | 2016158345 A | * | 9/2016 |

OTHER PUBLICATIONS

International Search Report for Application No. PCT/EP2017/071528 dated Nov. 21, 2017 (English Translation, 2 pages).

* cited by examiner

METHOD FOR CONNECTING FLAT WIRE ENDS AND STATOR PRODUCED IN SUCH A WAY

BACKGROUND OF THE INVENTION

The present invention relates to a method for connecting flat wire ends of a stator of an electrical machine, as well as to a stator produced in such a way of an electrical machine.

Electrical machines are known from the prior art in various embodiments. In order to provide the most compact electrical machines possible, it is attempted to increase a power density of the electrical machines. In this case, for stators, it is known to use flat wire, which comprises four flat sides, namely two broad sides and two narrow sides, in order to increase a fill factor in slots of a stator. By means of this, the electrical machine can be operated using a higher current for example, whereby a drive power can be increased. As is known, the wire connections between the slots are arranged within winding heads, wherein the winding heads should be designed to be as short as possible concerning the axial length of the stator in order to ensure that an electromagnetically effective region of the electrical machine assumes as great a portion of the axial installation space as possible. When producing such stators, free flat wire ends must be electrically connected to each other after the winding process and the assembly process. Usually, this takes place in such a way that the flat wire ends on the stator are initially stripped and then connected to each other by means of a laser. By reducing the winding head level in the axial direction, now, the problem arises that, during laser welding, a thermal input comes closer to a point where the flat wire comprises the insulation material. In this case, the insulation material can only resist a certain maximum temperature without being damaged. Therefore, up to now, the flat wire ends freed from the insulation material must be as long as possible in order to reduce the thermal influence on the rest of the insulation material of the flat wire. However, this can lead to necessary clearance and creepage spacing specifications no longer being able to be upheld on the finished stator. Therefore, the necessity exists to provide a winding head of a stator of an electrical machine which comprises an axial level that is as low as possible and, nevertheless, can uphold all necessary electrical specifications. Furthermore, from DE 102013006361 A1, a method for stripping a cylindrical electrical conductor is known where a mechanical roughening takes place after stripping.

SUMMARY OF THE INVENTION

The method according to the invention for connecting free flat wire ends has the advantage that a significant time saving is possible during the flat-wire-end stripping process. Furthermore, an improved insulation towards adjacent wires results. The flat wire ends comprise four sides and each flat wire end has an essentially rectangular cross section. In particular, rounded transitions to the adjacent side can be provided on the corner regions of the flat wires. In the case of a stator of an electrical machine, the flat wire ends are provided as part of a winding. The method according to the invention comprises the steps of stripping a first flat wire end provided with an electrical insulation material in such a way that at least a partial stripping of three sides of the flat wire is performed. However, the insulation material on the fourth side of the flat wire remains completely intact. Thereby, in the case of the four-sided flat wire end, one side fully remains provided with insulation material up to the free end of the flat wire end. Then, in a next step, the partially stripped first flat wire end is electrically connected to a second flat wire end. The flat wire furthermore has the advantage that a fill factor of slots on the stator of the electrical machine can be enlarged since a clearance portion in the slots can be very small due to the essentially rectangular flat wires.

The subclaims show preferred developments of the invention.

Preferably, a first side and a second side of the flat wire end are only partially stripped to an extent H, starting from a free end of the flat wire end, and a third side of the flat wire end is fully stripped to the extent H. By means of this, a required time for stripping can be still further reduced since two sides are only partially stripped. As an alternative, three sides of the flat wire end are fully stripped to the extent H.

In the case in which two sides of the flat wire end are only partially stripped, the stripped surfaces on the first and second side are particularly preferably identical in size. Being furthermore preferred, a boundary line between the stripped surface and the insulated surface on the first and second side is arched, in particular circularly arched or parabolic.

Being particularly preferred, the second flat wire end is also at least partially stripped on three sides like the first flat wire end. Preferably, the first and second flat wire end, which should be connected to one another, are stripped in the same way.

Connecting the flat wire ends preferably takes place without using an additional material. Connecting particularly preferably takes place by means of a thermal joining method, in particular a laser. For example, a $CO_2$ laser and/or a YAG laser can be used as a laser.

Preferably, the laser is moved back and forth during the connection process, particularly preferably in the direction of the wide flat sides of the flat wire ends. Being particularly preferred for connecting, the laser is applied perpendicularly to the free end surfaces of the flat wire ends, meaning the front side.

In accordance with another preferred embodiment of the present invention, a multiplicity of flat wire ends are connected to each other in a row, wherein the first and the last flat wire end in the row are stripped in such a way that the insulation material is at least partially stripped on three sides of the flat wire ends and remains intact on the fourth side. The flat wire ends, which are arranged between the first and the last flat wire end in the row, are stripped on four sides. Thereby, all flat wire ends of this row must no longer be fully stripped, but one side remains provided with insulation on the first and the last flat wire end of the row.

Furthermore, the present invention relates to a stator of an electrical machine comprising a flat wire connection that is established according to a method according to the invention. Being particularly preferred, the stator is provided with a winding head and the flat wire connection is provided on free flat wire ends of the winding head. Thereby, the free flat wire ends are preferably arranged in the form of two rows concentrically to a middle axis of the stator.

Being particularly preferred, in the case of the stator according to the invention, adjacent flat wires are connected to each other by means of a melting in such a way that a spacing of each edge point at the transition of the insulated region to the stripped region of the flat wire end comprises a spacing determined perpendicular to a tangent at this point from an edge point of the melting, which is identical in size for all edge points. By means of this, an oval-shaped edge curve results for the melting connecting the flat wires.

BRIEF DESCRIPTION OF THE DRAWINGS

Preferred exemplary embodiments of the invention are described in detail in the following with reference to the accompanying drawing. The drawing shows.

DETAILED DESCRIPTION

A stator 1 and a method according to the invention for connecting flat wire ends are described in detail in the following with reference to FIGS. 1 to 7.

Figure 1:
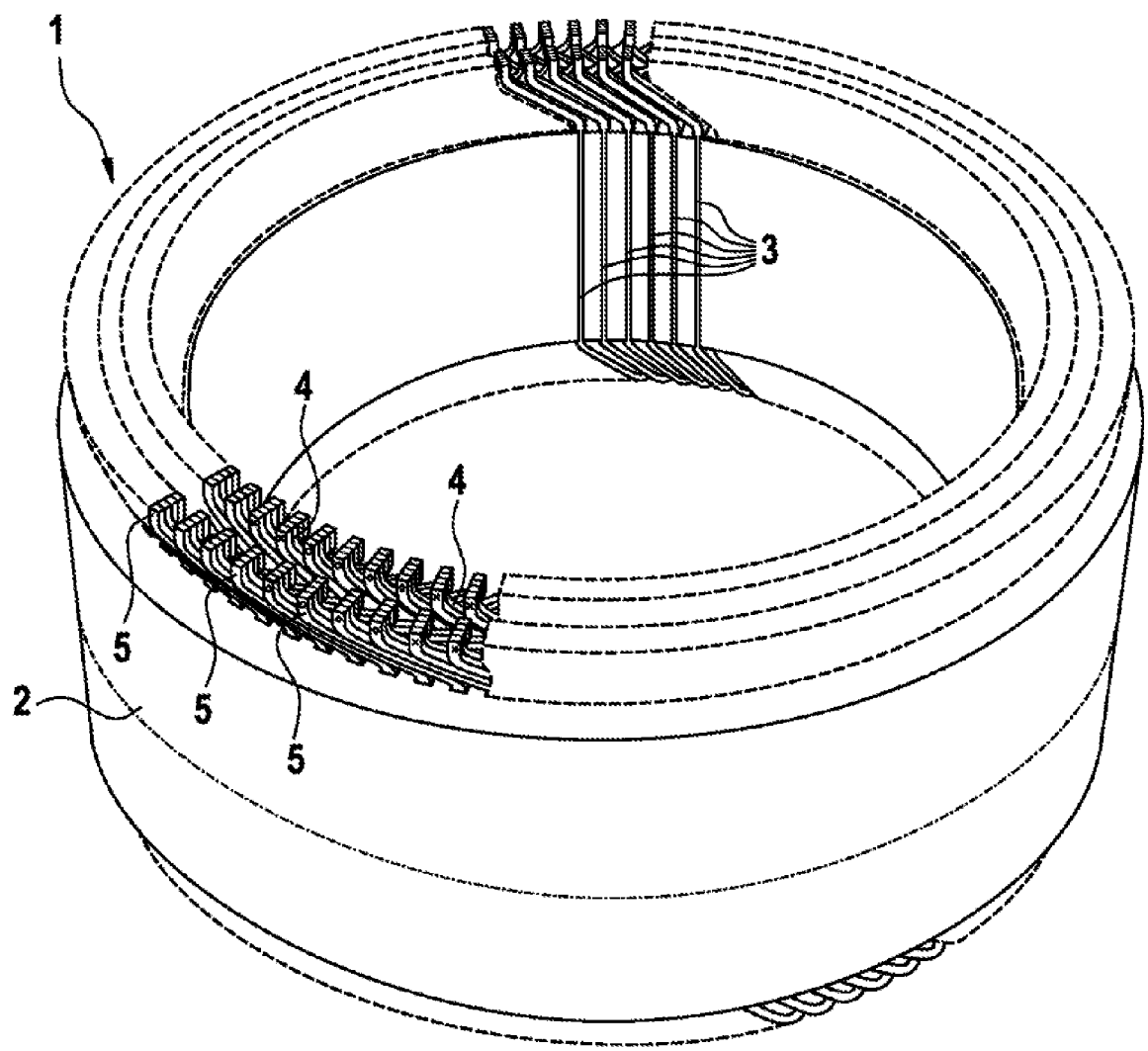
FIG. 1 a perspective view of a stator of an electrical machine, where the method according to the invention can be applied, FIGS. 2 to 5 lateral views of flat wire ends of the stator, which should be connected to one another, FIG. 6 an enlarged lateral view of two flat wire ends to be connected to one another, FIG. 7 an enlarged lateral view of the two flat wire ends in FIG. 6 in the state connected to one another, FIG. 8 a schematic lateral view of two flat wire ends in the non-connected state in accordance with a second exemplary embodiment of the invention, and FIG. 9 a schematic lateral view of a row of flat wire ends in the non-connected state in accordance with a third exemplary embodiment of the invention.

FIG. 1 schematically shows a stator 1 of an electrical machine, which comprises a stator laminated core 2 with stator slots 3. In the stator slots 3, flat wire conductor elements of an electrical winding are respectively arranged. FIG. 1 schematically shows the state after winding and joining of the winding elements have been performed, wherein a row of two flat wire ends are respectively arranged on an axial end side of the stator in the still non-connected state.

As is evident from FIG. 1, a multiplicity of first flat wire ends 4 and a multiplicity of second flat wire ends 5 are concentrically arranged respectively in such a way that a pair of flat wires comprising a first flat wire end 4 and a second flat wire end 5 are arranged next to one another. In order to complete the electrical winding, now, the two flat wire ends, which are each arranged adjacent to one another, must be connected to one another in a substance-to-substance manner.

Figure 2:
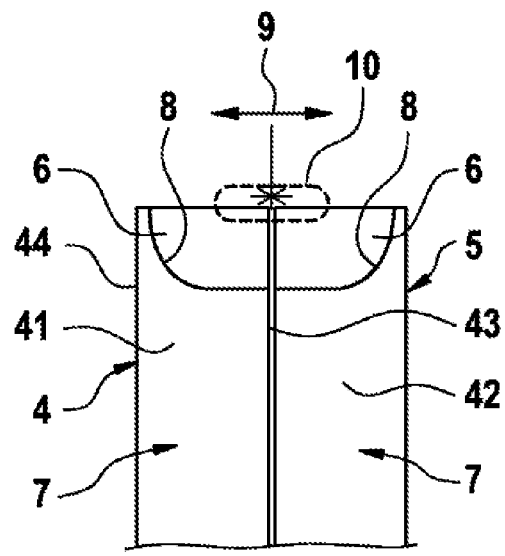
Figure 3:
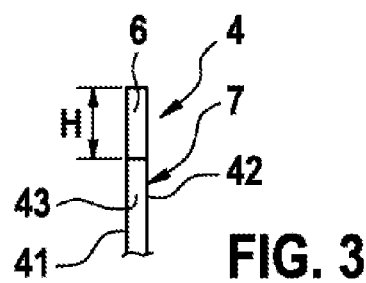
Figure 4:
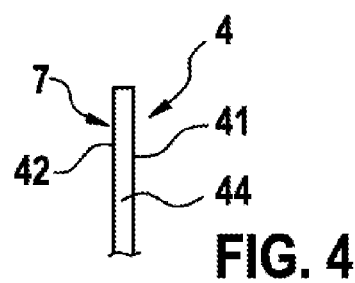

In order to make this substance-to-substance connection possible, the flat wires were stripped before the winding process or joining process of the winding elements on the flat wire ends. In FIGS. 2 to 6, it is now shown how each of the multiplicity of flat wire ends 4, 5 is stripped. FIG. 2 schematically shows a front view of a first flat wire end 4 and a second flat wire end 5, which are arranged adjacent to one another and should be connected to one another. The two flat wire ends 4, 5 are identically stripped and arranged opposite to one another in a mirror-inverted manner in FIG. 2.

Each of the flat wire ends 4, 5 comprises four sides, namely two wide flat sides 41, 42 and two narrow flat sides 43, 44.

Figure 5:
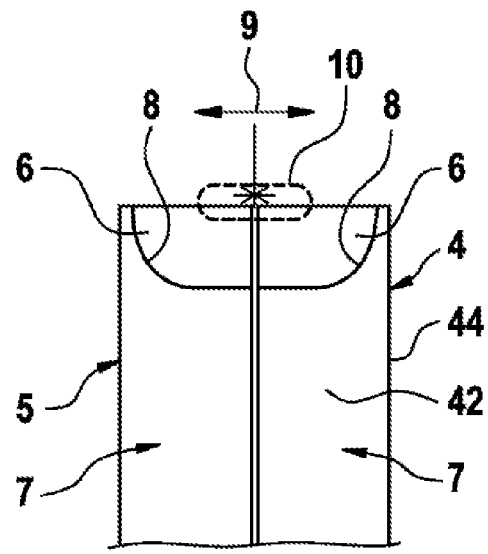

As is evident from FIGS. 2 and 5, a first flat side 41 and a second flat side 42, which form the wide flat sides, are stripped in the same way. In FIGS. 2 to 6, the stripped regions are identified with reference number 6 and the insulated regions are identified with reference number 7.

Figure 6:
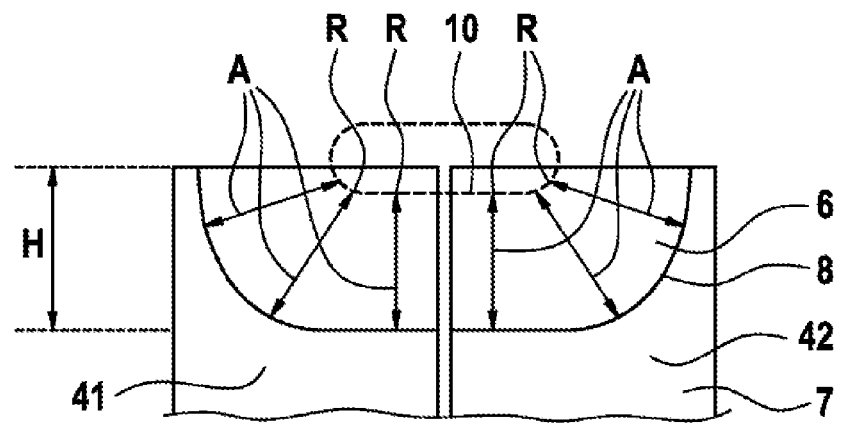

As is evident from FIGS. 2 and 6, the stripped regions are formed in such a way that the stripped regions 6 are only partially stripped to an extent H, starting from a free end of the flat wire ends on the wide flat sides. A third side 43 is fully stripped to the extent H and a fourth side 44 is not stripped at all. Thereby, the insulation is still present on the fourth side 44.

As is shown in FIGS. 2 and 5, on the first flat side 41 and the second flat side 42, the insulation material is stripped in such a way that a boundary line 8 between the stripped region 6 and the insulated region 7 is arched.

Thereby, according to the invention, only one side of the flat wire end is fully stripped to an extent H, namely the third flat side 43, and two sides of the flat wire end are only partially stripped, namely, as is shown in FIGS. 2, 5 and 6, with an arched boundary line 8. The fourth flat side 44 of the flat wire is not stripped.

Figure 7:
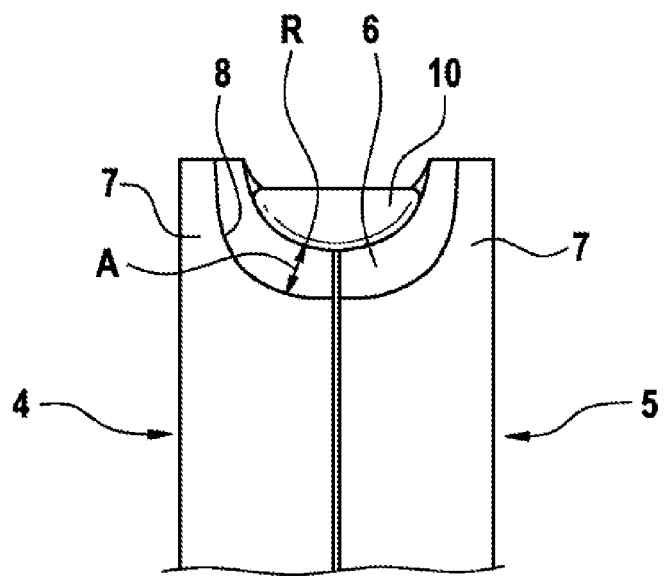

Now, in the stator, the first and second flat wire end 4, 5 are arranged opposite to one another, as is shown in FIGS. 2, 5, 6 and 7, and that being on the respective narrow flat sides, which are fully stripped to the extent H. In a next step, an electrical connection of the two flat wire ends 4, 5 now takes place on the respectively fully stripped side 44. The connected flat wire ends 4, 5 are shown in FIG. 7.

Thereby, according to the invention, it can be achieved that the complete end region of the flat wire ends 4, 5 no longer must be stripped on all four sides up to an identical extent, but a stripping occurs only on three sides, wherein only one side thereof is fully stripped, and the two other flat wire sides are partially stripped. Thereby, the stripping preferably takes place before the winding process or the joining process of the winding elements. In particular, this still makes a precise quality inspection of the stripping possible.

The connection of the flat wire ends preferably takes place by means of a laser, which takes place by means of a linear back and forth movement of the laser on the front sides of the flat wire ends 4, 5, as is indicated in FIGS. 2 and 5 by the double arrow 9. By means of this, a melting 10 results, which preferably comprises an identical spacing A up to the boundary line 8 between the stripped region 6 and the insulated region 7 on each edge point R. The spacing A is measured perpendicularly to a respective tangent on the boundary line 8.

The connection is preferably established by means of a laser and without the use of an additional material. By means of this, the electrical connection can be established very easily and quickly.

In order to avoid a heat input that is too high during the connection step by means of a laser, the laser is moved back and forth several times in a linear manner on the front sides of the flat wire ends, as is indicated by the double arrow 9.

The melting 10 is preferably oval.

It must be noted that, after the connection step, the melting 10 and the other stripped regions of the flat wire ends 4, 5 can additionally still be wrapped with another insulation in order to avoid spark discharges between the conductor ends of different electrical phases.

The extent H, to which the third side 43 of the flat wire end 4 is fully stripped, is selected in such a way that a secure electrical connection of two adjacent flat wire ends 4, 5 oriented towards each other is possible.

Figure 8:
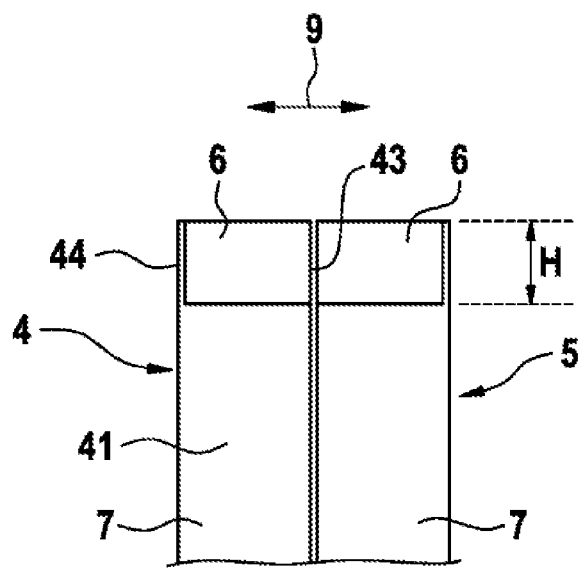

FIG. 8 shows a first and second flat wire end 4, 5 in accordance with a second preferred exemplary embodiment of the invention. In contrast to the first exemplary embodiment, in the case of the second exemplary embodiment, the wide flat sides 41, 42 are fully stripped. The narrow third flat side 43 is fully stripped again and the fourth flat side 44 is not stripped and thereby still comprises the complete insulation. A connection of the two flat wire ends 4, 5 is established again by means of a linear movement 9 of a laser or the like to produce a melting between the two flat wire ends 4, 5, like in the first exemplary embodiment.

Figure 9:
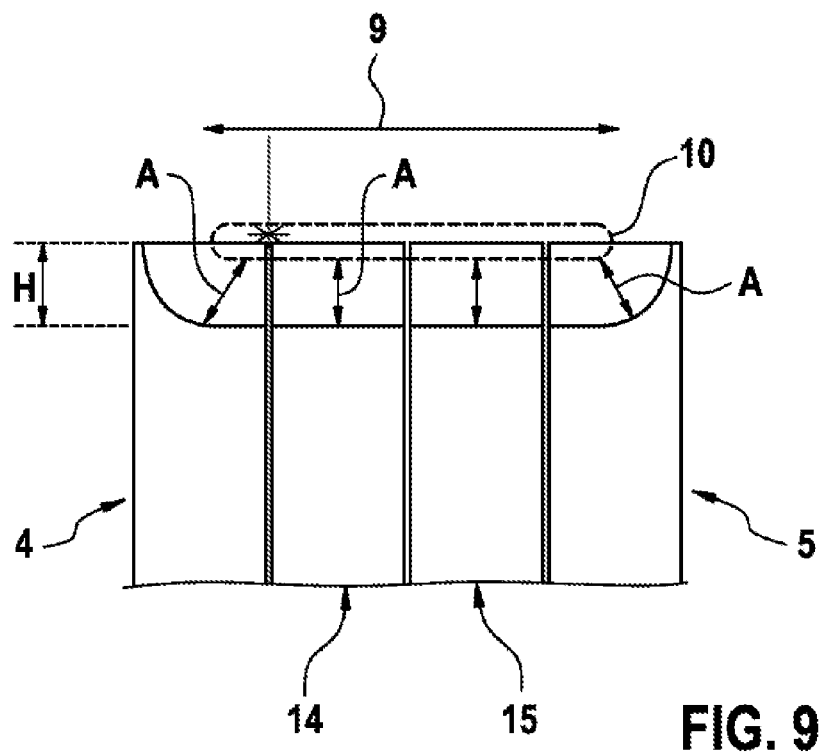

FIG. 9 shows an arrangement of flat wire ends of a stator in accordance with a third exemplary embodiment of the invention. As is evident from FIG. 9, altogether, four flat wire ends are arranged in a row and oriented towards each other on the narrow sides. Thereby, the row arrangement of the flat wire ends comprises a first flat wire end 4, a second flat wire end 5, a third flat wire end 14 and a fourth flat wire end 15. The first flat wire end 4 and the second flat wire end 5 are stripped as in the first exemplary embodiment. That means, the first and second flat wire end 4, 5 comprises two at least partially stripped regions and a non-stripped region 44 as well as a region 43 that is fully stripped to an extent H. The third flat wire end 14 and the fourth flat wire end 15 are also identically stripped and are stripped on all four sides to the extent H. An electrical connection of the four arranged flat wire ends 4, 5, 14, 15 is, in turn, established by means of a linear movement indicated by the double arrow 9, for example, of a laser to produce the melting 10 in order to electrically connect the four flat wire ends to each other. The third exemplary embodiment should indicate that it is possible that a multiplicity of flat wire ends can be successively arranged in a row, wherein the respective first and last flat wire end is at least partially stripped only on three sides according to the specification according to the invention. It must be noted that the first and last flat wire end of the row of the multiplicity of flat wire ends can be fully stripped on three sides, as is also shown in the second exemplary embodiment in FIG. 8, and cannot be stripped on the fourth side.

Thereby, according to the invention, a time duration for the step entailing the stripping of flat wire ends can be significantly reduced. Since, in the case of a stator, a multiplicity of flat wire ends must be stripped, in total, great time savings, which ends up being a great cost advantage for this mass-produced component, result due to the sum of the respectively short time intervals, which are saved during the stripping step. The winding process or joining process of the winding elements of the stripped flat wires can then take place in a usual way just like the electrical connection, preferably by means of a laser.

What is claimed is:

1. A method for connecting free flat wire ends (4, 5), each having an essentially rectangular cross section, of a stator of an electrical machine, the method comprising the steps:
providing a first flat wire end (4) which has an essentially rectangular cross section and which is coated with an insulation material on first, second, third and fourth sides (41, 42, 43, 44),
at least partially stripping the first flat wire end (4) on three of the sides (41, 42, 43) to provide a stripped first flat wire end (4) with the third side (43) being fully stripped, wherein the insulation material remains completely intact on the fourth side (44) of the stripped first flat wire end (4), and
providing an electrical connection of the stripped first flat wire end (4) on the fully stripped side (43) to a second flat wire end (5).

2. The method as claimed in claim 1, wherein the first side (41) and the second side (42) of the stripped first flat wire end (4) are only partially stripped to an extent (H), starting from a free end of the first flat wire end (4), and the third side (43) of the stripped first flat wire end (4) is fully stripped to the extent (H).

3. The method as claimed in claim 2, wherein stripped surfaces on the first side (41) and the second side (42) are identical in size.

4. The method as claimed in claim 2, wherein a boundary line (8) between a stripped region (6) and an insulated region (7) of the first flat wire end (4) is arched.

5. The method as claimed in claim 2, wherein a boundary line (8) between a stripped region (6) and an insulated region (7) of the first flat wire end (4) is circularly arched or parabolic.

6. The method as claimed in claim 1, characterized in that the second flat wire end (5) is stripped in the same way as the first flat wire end (4).

7. The method as claimed in claim 1, wherein the first and second flat wire ends (4, 5) are connected to one another without using an additional material.

8. The method as claimed in claim 1, wherein the electrical connection is provided by a thermal joining process.

9. The method as claimed in claim 8, wherein a welding device for establishing the electrical connection between the first and second flat wire ends (4, 5) is moved back and forth several times in a linear manner.

10. The method as claimed in claim 1, wherein a multiplicity of flat wire ends are arranged in a row and connected to one another, and wherein the first flat wire end (4) and a last flat wire end (5) of the row of flat wire ends are stripped in such a way that the insulation material is at least partially stripped on three sides of the first and last flat wire ends and remains intact on the fourth side.

11. A method of producing a stator of an electrical machine, the method comprising providing a flat wire connection according to the method as claimed in claim 1.

12. The method as claimed in claim 1, wherein the electrical connection is provided by welding.

13. The method as claimed in claim 1, wherein the electrical connection is provided by laser welding.

14. A method of producing a stator of an electrical machine by connecting adjacent, free flat wire ends (4, 5) of the stator, each of the free flat wire ends (4, 5) having an essentially rectangular cross section, the method comprising the steps:
providing a first flat wire end (4) which has an essentially rectangular cross section and which is coated with an insulation material on first, second, third and fourth sides (41, 42, 43, 44),
at least partially stripping the first flat wire end (4) on three of the sides (41, 42, 43) to provide a stripped first flat wire end (4) with the third side (43) being fully stripped, wherein the insulation material remains completely intact on the fourth side (44) of the stripped first flat wire end (4), and
providing an electrical connection of the fully stripped side (43) of the first flat wire end (4) to a second flat wire end (5) adjacent to the first flat wire end (4),
wherein the first and second adjacent flat ends (4, 5) are connected to each other by means of a melting (10) in such a way that a spacing (A) of each point of a boundary line (8) between a stripped region (6) and an insulated region (7) of the first and second flat wire ends (4, perpendicular to a tangent on the boundary line (8) is identical in size up to an edge point (R) of the melting (10).

15. A stator of an electrical machine, comprising a flat wire connection including a stripped first flat wire end (4) with first and second sides (41, 42) being partially stripped of insulation material and a third side (43) being fully stripped of insulation material, wherein the insulation material remains completely intact on a fourth side (44) of the stripped first flat wire end (4), and wherein the stripped first flat wire end (4) is electrically connected on the fully stripped side (43) to a second flat wire end (5).

16. A method for connecting a plurality of free flat wire ends of a stator of an electrical machine, the plurality of free flat wire ends including first, second and one or more third flat wire ends (4, 5, 14, 15) each having an essentially rectangular cross section, the method comprising the steps:
   providing the first and second flat wire ends (4, 5) coated with an insulation material on first, second, third and fourth sides (41, 42, 43, 44),
   at least partially stripping each of the first and the second flat wire ends (4, 5) on the first, second and third sides (41, 42, 43) to provide stripped first and second flat wire ends (4) with the third side (43) being fully stripped, wherein the insulation material remains completely intact on the fourth side (44),
   providing the one or more third flat wire ends (14, 15) arranged in a row with and between the first and second flat wire ends (4, 5), each of the one or more third flat wire ends (14, 15) being coated with an insulation material on first, second, third and fourth sides (41, 42, 43, 44),
   fully stripping each of the one or more third flat wire ends (14, 15) on the first, second, third and fourth sides (41, 42, 43, 44),
   electrically connecting the fully stripped third side (43) of the first flat wire end (4) to one of the third and fourth sides (41, 42, 43, 44) of a first one of the one or more third flat wire ends (14, 15), and
   electrically connecting the fully stripped third side (43) of the second flat wire end (4) to one of the third and fourth sides (41, 42, 43, 44) of a last one of the one or more third flat wire ends (14, 15), with any additional ones of the one or more third flat wire ends (14, 15) being between the first and the last of the one or more third flat wire ends (14, 15) and each being electrically connected on a respective third side to an adjacent one of the one or more third flat wire ends (14, 15) and on a respective fourth side to an adjacent different one of the one or more third flat wire ends (14, 15).

17. The method as claimed in claim 16, wherein the first side (41) is opposite of the second side (42) on each of the first and second flat wire ends (4, 5), and
   wherein the third side (43) is opposite the fourth side (44) on each of the first and second flat wire ends (4, 5).

18. The method as claimed in claim 16, wherein the first and the last of the one or more third flat wire ends (14, 15) are different flat wire ends.

19. The method as claimed in claim 16, wherein the one or more third flat wire ends (14, 15) include only the first and the last of the one or more third flat wire ends (14, 15), and wherein one of the third and fourth sides (41, 42, 43, 44) of the first one of the one or more third flat wire ends (14, 15) is electrically connected to one of the third and fourth sides (41, 42, 43, 44) of the last one of the one or more third flat wire ends (14, 15).

* * * * *